(12) United States Patent
Aliakseyeu et al.

(10) Patent No.: US 10,609,794 B2
(45) Date of Patent: Mar. 31, 2020

(54) ENRICHING AUDIO WITH LIGHTING

(71) Applicant: SIGNIFY HOLDING B.V., Eindhoven (NL)

(72) Inventors: Dzmitry Viktorovich Aliakseyeu, Eindhoven (NL); Berent Willem Meerbeek, Veldhoven (NL); Bartel Marinus Van De Sluis, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/087,321

(22) PCT Filed: Mar. 14, 2017

(86) PCT No.: PCT/EP2017/055907
§ 371 (c)(1),
(2) Date: Sep. 21, 2018

(87) PCT Pub. No.: WO2017/162469
PCT Pub. Date: Sep. 28, 2017

(65) Prior Publication Data
US 2019/0104593 A1    Apr. 4, 2019

(30) Foreign Application Priority Data

Mar. 22, 2016  (EP) .................................... 16161674

(51) Int. Cl.
*H05B 37/02*    (2006.01)
*G06F 16/60*    (2019.01)
*G06F 16/738*   (2019.01)
*G06F 16/783*   (2019.01)
*G06F 16/683*   (2019.01)

(52) U.S. Cl.
CPC .......... *H05B 37/029* (2013.01); *G06F 16/60* (2019.01); *G06F 16/683* (2019.01); *G06F 16/739* (2019.01); *G06F 16/785* (2019.01); *G06F 16/7834* (2019.01); *H05B 37/0236* (2013.01)

(58) Field of Classification Search
CPC ... H05B 37/029; H05B 37/0236; G06F 16/60; G06F 16/785; G06F 16/683; G06F 16/7834; G06F 16/739
See application file for complete search history.

(56) References Cited

U.S. PATENT DOCUMENTS

| 8,374,880 B2 | 2/2013 | Van De Sluis et al. |
| 8,461,443 B2 | 6/2013 | McKinney et al. |
| 9,183,883 B2* | 11/2015 | De Waele ............... A63J 17/00 |
| 10,289,929 B2* | 5/2019 | Dill ........................... A63J 1/02 |

(Continued)

FOREIGN PATENT DOCUMENTS

| WO | 2005084339 A2 | 9/2005 |
| WO | 2006003624 A1 | 1/2006 |

(Continued)

*Primary Examiner* — Tony Ko
(74) *Attorney, Agent, or Firm* — Meenakshy Chakravorty

(57) ABSTRACT

A method of generating a lighting effect based on metadata of an audio stream, the method comprising steps of: extracting metadata items from the audio stream; retrieving a first set of one or more images based on the metadata items; controlling a light source to generate a lighting effect based on said first set of one or more images.

13 Claims, 6 Drawing Sheets

(56) References Cited

U.S. PATENT DOCUMENTS

| | | | |
|---|---|---|---|
| 2011/0190913 A1 | 8/2011 | Van De Sluis et al. | |
| 2012/0025717 A1* | 2/2012 | Klusmann | H05B 37/0218 |
| | | | 315/152 |
| 2014/0122465 A1 | 5/2014 | Bilinski et al. | |
| 2015/0002046 A1 | 1/2015 | Schlangen | |
| 2018/0295317 A1* | 10/2018 | Tyagi | H04N 21/44218 |
| 2019/0286408 A1* | 9/2019 | Beaumier | G06F 3/0482 |

FOREIGN PATENT DOCUMENTS

| | | |
|---|---|---|
| WO | 2008068698 A1 | 6/2008 |
| WO | 2015169157 A1 | 11/2015 |

\* cited by examiner

ENRICHING AUDIO WITH LIGHTING

CROSS-REFERENCE TO PRIOR APPLICATIONS

This application is the U.S. National Phase application under 35 U.S.C. § 371 of International Application No. PCT/EP2017/055907, filed on Mar. 14, 2017, which claims the benefit of European Patent Application No. 16161674.3, filed on Mar. 22, 2016. These applications are hereby incorporated by reference herein.

TECHNICAL FIELD

The present disclosure relates to controlling lighting devices based on audio.

BACKGROUND

WO 2006/003624A1 discloses a method for color extraction from video content, which can take into account meta data, embedded in an audio-videostream, indicative of a lighting effect.

US 2014/122465A1 discloses a method for a weighted ranking of music items based on a personal item characteristic and for providing a search result list ordered based on the ranking.

WO 2008/068698A1 discloses a method of facilitating accompanying an image or video rendering with a concurrent controlled ambient lighting, wherein the color selection for the ambient lighting is performed in dependence upon scene lighting information associated with the image or video.

WO 2005/084339A2 discloses a method of illuminating an environment in coordination with a media display, wherein a mapping between a visualization and a lighting control system can be modified by a user.

Electronic devices are becoming ever more connected. A "connected" device refers to a device such as a user terminal, or home or office appliance or the like that is connected to one or more other such devices via a wireless or wired connection in order allow more possibilities for control of the device. For instance, the device in question is often connected to the one or more other devices as part of a wired or wireless network, such as a Wi-Fi, ZigBee or Bluetooth network. The connection may for example allow control of the device from one of the one or more other devices, e.g. from an app (application) running on a user terminal such as a smart phone, tablet or laptop; and/or may allow for sharing of sensor information or other data between the devices in order to provide more intelligent and/or distributed automated control.

In recent years, the number of connected devices has increased dramatically. Lighting systems are part of this movement towards a connected infrastructure. Conventional connected lighting systems consist of light sources which can be controlled through wall-mounted switches, dimmers or more advanced control panels that have pre-programmed settings and effects, or even from an app running on a user terminal such as a smart phone, tablet or laptop. For example, this may allow user to create an ambiance using a wide range of coloured lighting, dimming options and/or dynamic effects. In the home environment, at least one existing system also offers consumers the possibility to implement such a connected lighting solution through retrofit bulbs that can fit into traditional light fittings.

Audio devices may also be "connected". For example, a connected audio system may comprise audio devices (e.g. speakers) placed throughout the environment which are similarly connected and controlled as in the above lighting system example. Audio devices are commonly connected to a central control device such as a TV, and may also be connected to the internet, e.g. providing access to an internet radio station.

It is possible for users to combine lighting with audio such as music to enhance the overall atmosphere. Philips Hue bulbs are an example of connected lighting devices, and there are mobile applications available which use the mobile device's microphone to listen to audio playing within an environment and control the bulbs based on the audio.

SUMMARY

As outlined in above, people enjoy creating rich atmospheres where a (dynamic) light scene is rendered based on music. However, current implementations such as those available for the Hue system are based on rendering light effects by analyzing an audio stream. However, these prior art systems are concerned with precisely aligning the lighting to the music and only use the actual waveform of the audio as an input (e.g. via a microphone). A simple example is the detection of the 'beat' in the music and creating light pulses that are synchronized to this. Such 'harsh' light effects can be counterproductive. For example, the detection of beats in an audio signal is ill-suited to creating a lighting effect to accompany some types of audio such as audio books, or to creating a general overall ambience that compliments the feel, harmony, or melody of the music rather than necessarily emphasizing the beat of the music.

The present disclosure recognizes that temporal alignment of audio and lighting effects is not always important or even desirable. If the audio is, for example, an audio book or a podcast then it would be inappropriate to apply beat-detection techniques to the audio and control the lighting to synchronize with the beat. Even if the audio is music, in general the light dynamic does not have to be (exactly) aligned with the music to have a positive effect. In both cases of aligned or non-aligned dynamics the selection of suitable colours plays an important role. Depending on the application, different approaches can be used, for example it is known to use colours that are associated with the mood of the song or using an album art. It may not always be clear what property of the played composition (any metadata associated with it) to use to select these colours.

To address the above-mentioned problems, the present disclosure teaches the retrieval of a set of images based on values of metadata items as a means to select a complementary combination of colours for a light scene.

According to one aspect disclosed herein, there is provided a method of generating a lighting effect based on metadata of an audio stream, the method comprising steps of: extracting one or more metadata items from the audio stream; retrieving a first set of one or more images based on values of the metadata items; controlling a light source to generate a lighting effect based on said first set of one or more images.

In embodiments, the method further comprises a step of: ranking the metadata items from a highest ranked metadata item to a lowest ranked metadata item; and wherein said retrieved set of images is retrieved based on the value of a highest ranked metadata item.

In embodiments, said first set of one or more images is retrieved based on the highest ranked metadata item, and the method further comprises steps of: determining a consistency of the set of images retrieved based on the highest ranked metadata item; and, on condition that said consistency is less than a threshold consistency, retrieving a second set of images based on the value of a second highest ranked metadata item; wherein said controlled light source is controlled to generate the lighting effect based on said second set of images.

In embodiments, said set of one or more images is a set of a plurality of images and said consistency is at least an inter-image consistency.

In embodiments, said consistency is at least an intra-image consistency.

In embodiments, the method further comprises a step of, on condition that the determined consistency of the set of images retrieved based on the second highest ranked metadata is not greater than the threshold consistency, reducing the threshold consistency; and, on condition that the consistency of the set of images retrieved based on the highest ranked metadata item is greater than the reduced threshold, controlling the light source to generate the lighting effect based on said first set of images.

In embodiments, the method further comprises a step of identifying whether a dedicated lighting effect associated with the audio stream is stored in a memory; and, on condition that a dedicated lighting effect exists, controlling the light source to generate the dedicated lighting effect.

In embodiments, the lighting effect generated based on said first set of one or more images is subsequently stored associated with the audio stream in the memory.

In embodiments, the step of extracting the metadata items comprises extracting the metadata items using audio fingerprinting.

In embodiments, the step of extracting the metadata items comprises identifying the audio stream and retrieving the metadata items from a database based on the identification of the audio stream.

In embodiments, the metadata items comprise at least one of artist name, album name, mood, genre, playlist, album art, lyrics, and relevant words.

In embodiments, the method further comprises steps of extracting picture metadata items from the retrieved set of images; and retrieving a subsequent set of images based on the picture metadata items, and the step of controlling the light source to generate the lighting effect based on the subsequent set of images.

In embodiments, the step of retrieving a first set of one or more images based on the metadata items comprises performing an online image search based on the metadata items.

In embodiments, the ranking is performed based on a preferred ranking specified by one or more users. For example, one or more users of the user device, or one or more external users of the application who have previously input a preferred ranking which is stored by the application and accessible by a current user of the user device.

According to another aspect disclosed herein, there is provided a user device configured to perform a method of generating a lighting effect based on metadata of an audio stream, the method comprising steps of: extracting one or more metadata items from the audio stream; retrieving a first set of one or more images based on values of the metadata items; controlling a light source to generate a lighting effect based on said first set of one or more images.

According to another aspect disclosed herein, there is provided a computer program product for generating a lighting effect based on metadata of an audio stream, the computer program product comprising code embodied on a computer-readable storage medium, wherein the code is configured to as when run on one or more processing units to perform a method of generating a lighting effect based on metadata of an audio stream, the method comprising steps of: extracting one or more metadata items from the audio stream; retrieving a first set of one or more images based on values of the metadata items; controlling a light source to generate a lighting effect based on said first set of one or more images.

BRIEF DESCRIPTION OF THE DRAWINGS

To assist understanding of the present disclosure and to show how embodiments may be put into effect, reference is made by way of example to the accompanying drawing in which.

DETAILED DESCRIPTION OF EMBODIMENTS

Figure 1:
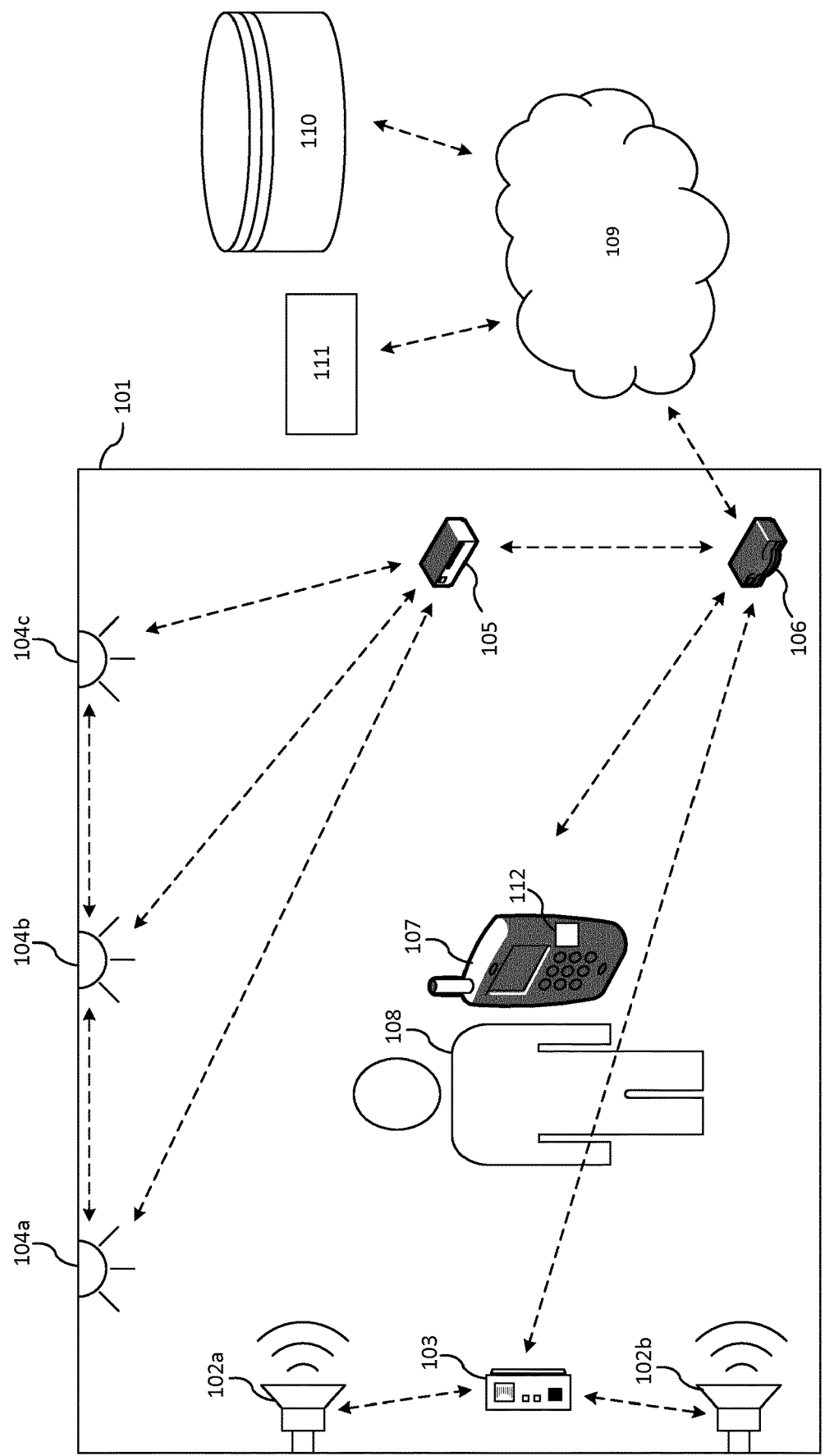
FIG. 1 is a diagram showing a system according to embodiments of the present invention.

This invention comprises a method to enrich the playback of audio with a (dynamic) lighting scene by acquiring metadata items (labels, pictures, video clips) and derive light control properties based on this. As used herein, the term "metadata items" is used to refer to the categories of metadata and the term "values" of metadata (or "metadata values") is used to refer to the particular value of a metadata item associated with a particular piece of audio. For example, "genre" metadata item for a particular piece of audio could have a value of "jazz" or "blues" etc.

With the advent of connected coloured lighting, it became easy for users to combine lighting with other types of media such as music to enhance the overall atmosphere. The Philips Hue system is a notable example, and has more than ten applications (mobile apps) available that in some way mix music with dynamic colour lighting (e.g. Hue Party and Hue Disco apps). Many of these apps crudely analyse the audio volume levels and adjust the light effect based on some mapping in order to align a lighting effect with the audio levels. However, the present invention recognises that to enhance the atmosphere it is not necessary to exactly align the music and lighting. Indeed, in some situations this might even be counterproductive. For example, lighting may be poorly temporally aligned with the beat of a piece of music. In this case well-designed slow dynamic lights with selected colours that are not synchronized with the music can be more appropriate in creating a coherent and pleasing overall atmosphere.

The present invention also recognises that there may not even be a discernible beat in a piece of music. In this case the beat detection method may result in a dynamic lighting effect which does not appear synchronised with the music in any way. An extreme example of this is when the audio the user wishes to enrich with lighting is some form of spoken word audio (e.g. an audio book or a podcast).

The present invention proposes to derive light properties (e.g. colors and/or patterns) based on the various metadata items, whereby the values of metadata item(s) that yield a coherent result in terms of found colors and patterns are selected as a basis for the light scene.

This allows many advantages over the prior art. For example, lighting to accompany an audio book can then be derived based on the semantic content of the story itself. This allows for appropriate lighting to be determined to enrich the story. For example, a children's fairytale such as "Little Red Riding Hood" could be accompanied with a "forest" lighting scene.

This can be realized using existing streaming services such as Spotify. Spotify has a database with metadata associated with a specific composition, playlist, performer, album etc. Examples are genre, mood, playlist name, artist, album etc. Using this data the light control application can extract metadata associated with the currently playing song; rank it based on set predefined rules and use it as keywords for search on sites like Google image or Flickr. Analyze the results of the search (for example limiting to the first twenty images) for the color palette consistency, if results are consistent, use the overall color palette to render a dynamic light scene. If results are not consistent use the second set of metadata as keywords, if none of the searches returned a consistent results the system might reduce the number of pictures it analyzes (e.g. only ten first) or ease the requirement on required consistency.

Regarding the ranking of the metadata, any suitable ranking may be used. What ranking scheme is appropriate may vary from user to user and from instance to instance. In a simple case, a user may simply specify their preferences regarding which metadata parameters are the most important (e.g. "always rank genre highest, if available"). It is also possible that multiple users share a streaming service. In these cases, the user who created a playlist might indicate the "preferred" metadata ranking for a particular song (or the entire playlist). This ranking can then be used for future instances of rendering that song.

Many streaming services allow songs and/or playlists to be associated with specific purposes (e.g. "exercising" or "relaxing"). In these cases, the ranking may also be based on the purpose of the song (or entire playlist). For example, in such case the same set of metadata can be prioritized differently based on the associated activity. E.g. when the purpose is "relaxing", the system may rank the "mood" metadata item highest, and when the purpose is "exercising", the system may rank the "artist" metadata item highest.

FIG. 1 shows an environment 101 such as a room in which both an example lighting system and an example audio system are present.

The audio system is shown comprising two speakers 102a, 102b and an audio controller 103, but it appreciated that any number of speakers may be present. As used herein, the term "speaker" is understood to refer to any audio device suitable for outputting a sound into the environment 101. As known to those skilled in the art, the audio controller 103 may be a dedicated controller device (as shown in FIG. 1) but may alternatively be integrated into another device (such as a television) or integrated into one of the speakers 102a, 102b. The audio controller 103 is communicatively coupled to each of the speakers 102a, 102b using any appropriate wired or wireless technology (e.g. Bluetooth) such that the audio controller 103 is able to control the speakers 102a, 102b to output sound into the room. Another alternative is for the audio controller 103 to be integrated into the user device 107. In this case, the user device 107 may be arranged to communicate control signals to the speakers 102a, 102b directly.

Audio controller 103 is communicatively coupled to a hub 106 such as a WiFi hub. In turn, the hub 106 is communicatively coupled to a user device 107 operated by a user 108. Hence, the user 108 is able to control the speakers 102a, 102b by inputting commands into the user device 107. The user device 107 is able to communicate with the hub 106 via any appropriate communication technology (typically WiFi standards in modern systems), and the hub 106 is similarly arranged to communicate with the audio controller 103 via any, possibly different, appropriate communication technology (e.g. Bluetooth).

The lighting system is shown to comprise three lighting devices 104a, 104b, 104c, and a bridge 105. Each of the three lighting devices 104a, 104b, 104c is able to communicate with the bridge 105 via any appropriate communication technology (typically ZigBee standards in modern lighting systems). The lighting system of FIG. 1 is shown with a "hub-and-spoke" topology, but other topologies are possible. For example, the ZigBee protocol allows for devices to be "chained" together. In which case, a signal may be routed from the bridge 105 to e.g. lighting device 104a via e.g. lighting device 104b.

The bridge 105 is communicatively coupled to the hub 106, typically via a direct wired connection. As mentioned above, the hub 106 is communicatively coupled to the user device 107 operated by the user 108. Hence, the user 108 is able to control the lighting devices 104a, 104b, 104c by inputting commands into the user device 107. The user device 107 is able to communicate with the hub 106 via any appropriate communication technology (typically WiFi standards in modern systems).

It is appreciated that the lighting system illustrated in FIG. 1 is only an example. Other possibilities are known to the person skilled in the art. For example, the mobile device 107 may communicate directly (i.e. not via the hub 106) with the bridge 105, or even each of the lighting devices 104a, 104b, 104c.

As is known in the art, the hub 106 may provide a connection to a Wide Area Network (WAN) such as an internet 109, e.g. the Internet. The term "internet" is used herein to refer in general to any type of Wide Area Network. Indeed, the principles of the invention may be applied to any network which allows the hub 106 to connect with and retrieve data from a database (as described in more detail below) such as a local network. As the audio controller 103, user device 107, and bridge 105 all each connected to the hub 106, this means that the audio controller 103, user device 107, and bridge 105 each have access to the internet 109 and can therefore access files and data stored on database 110 which may be an external database as provided for example by a third party. Note also that the database may also be a local database stored on, for example, the audio device 103 or the user device 107.

A controller 112 as shown in FIG. 1 runs on a processor of the user device 107 (described later). The controller 112 is configured to perform the steps according to methods disclosed herein, including at least extracting metadata item values from an audio stream, retrieving a first set of one or more images based on the metadata item values, and controlling a light source to generate a lighting effect based on said first set of one or more images. It is appreciated that the controller 112 need not be implemented on the user device 107. The controller 112 may be only partially implemented on the user device 107 and partially implemented on another processor other than the processor of the user device 107, e.g. an external one or more processing units such as server 111 shown in FIG. 1. Alternatively, the controller 112 may be implemented entirely externally from the user device 107 such as entirely implemented on server 111. Note also that a server as referred to herein may refer to one or more server units at one or more geographic sites.

In operation, the arrangement shown in FIG. 1 allows the user to play music via the speakers 102a, 102b and also to create a lighting effect using the lighting devices 104a, 104b, 104c. For example, music files stored on database 110 may be streamed to the speakers 102a, 102b via the internet 109, hub 106, and user device 107. As another example, lighting effects stored on the user device 107 may be communicated to the lighting devices by the user device 107 via the hub 106 and lighting bridge 105.

Figure 2:
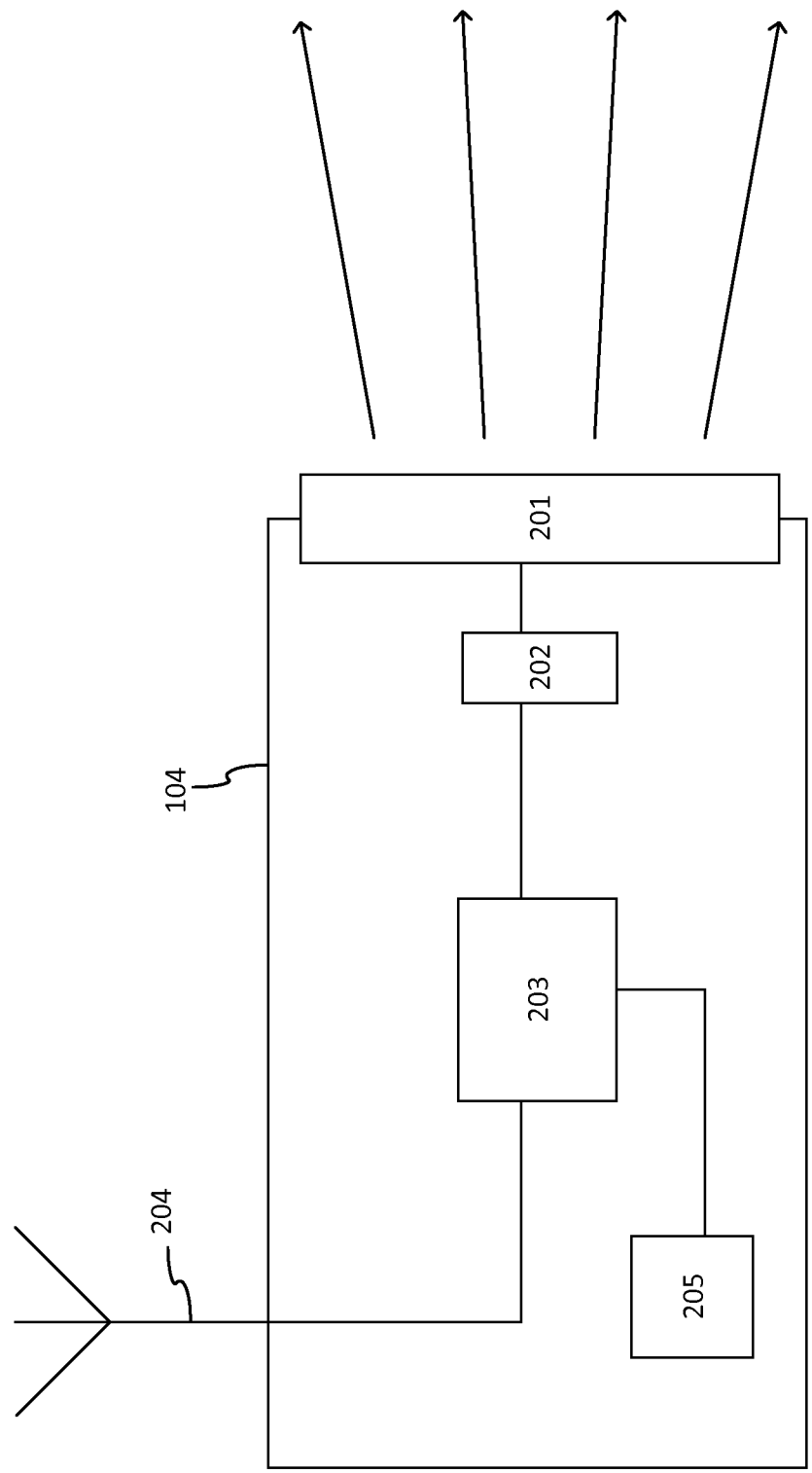
FIG. 2 is a schematic diagram showing a lighting device.

FIG. 2 illustrated a lighting device 104 according to the present invention. The lighting device 104 comprises a light source 201, a driver 202, a lighting controller 203, a lighting communications interface 204 and optionally a memory 205.

Figure 3:
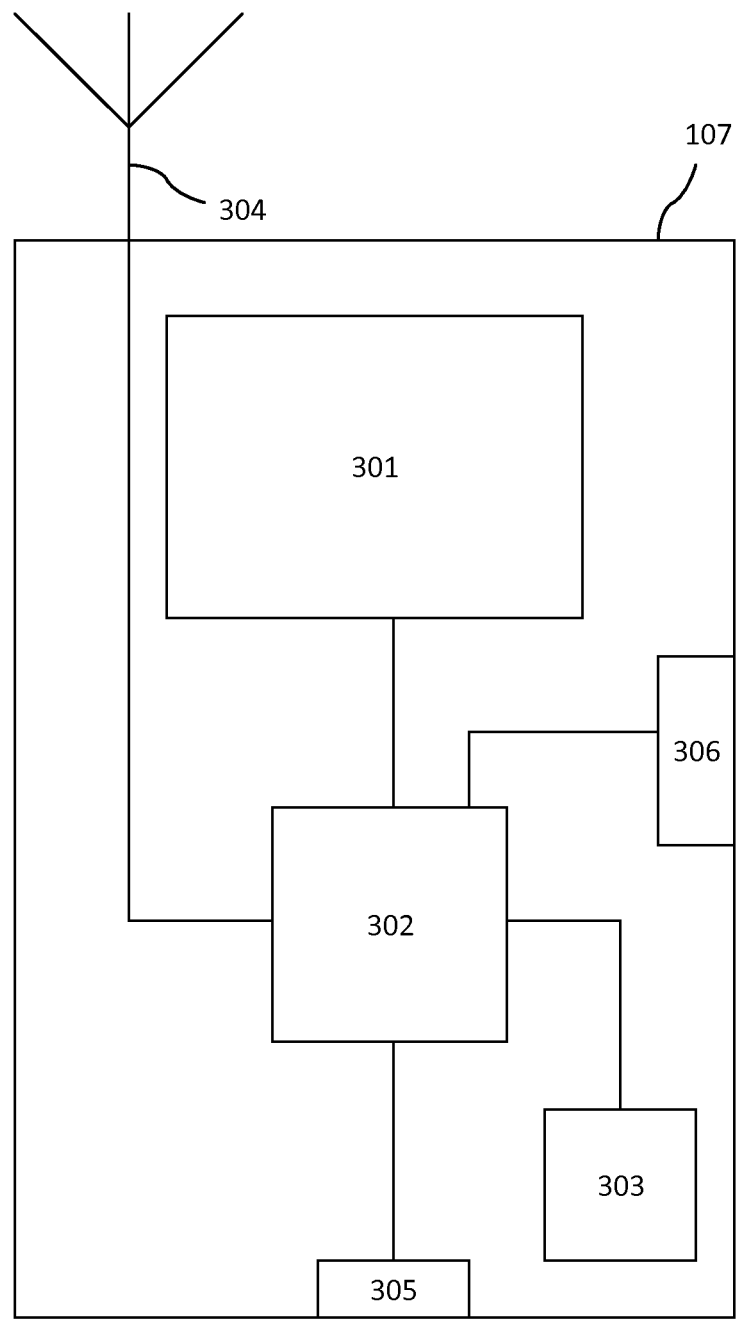
FIG. 3 is a schematic diagram showing a user device.

FIG. 3 illustrates a user device 107 according to the present invention. The user device 107 comprises a user interface (UI) 301, a processor 302, a memory 303, a communications interface 304 and optionally a microphone 305 and a user device speaker 306.

The processor 302 may comprise one or more processing units. In any case, the controller 112 may run on the processor 302 or, as described above, partially or wholly on one or more processors external from the user device 107 such as server 111.

Audio data such as music files may be stored on database 110, memory 303 of the user device 107, or a memory of the audio controller 103. Another possible source of audio data is a non-transitory storage medium such as a CD, in which case the audio controller 103 may comprise a CD player configured to read the CD. Yet another possibility is for the audio controller to comprise a radio frequency receiver configured to detect radio waves and thus play music through the speakers 102a, 102b as well known in the art. Radio stations that can also broadcast the metadata related to the song that is playing or about to be played. If the user device 107 comprises a user device speaker 306, it is also understood that the music may be played through user device speaker 306.

Music files and other audio data are generally associated with "metadata". For example, the metadata of a particular music file might include artist, song title, album, genre, mood etc. The present invention proposes to select a light effect based on the metadata of an audio stream.

In simple embodiments, items of metadata associated with audio playing the environment 101 are determined by the controller 112. Then an image search (e.g. a Google image search) is performed by the controller 112 based on the metadata. The resulting images are then used by the controller 112 to determine lighting settings for the lighting devices 104, e.g. by hue/brightness/saturation. Note that an image search (i.e. querying a database for relevant images) is not necessary in all embodiments. Instead, a set of images associated with a particular metadata item may already be stored in memory (either locally at the user device 107 or remotely) and therefore the controller 112 can retrieve the set of images directly, without having to perform a full image search.

The metadata may comprise a set of values of metadata items, in which case the image search may be performed based on only one of the metadata items. Hence, an optional step of ranking the metadata items from a highest ranked (most relevant) to lowest ranked (least relevant) may be performed by the controller 112 to allow the image search to be performed on the most relevant metadata item first. There is then also another optional additional step of the controller 112 checking that the resulting images based on the first search are acceptable (e.g. if the colours are consistent within the images or between the images). If the images are not acceptable, a second search can be performed by the controller 112 based on the second highest ranked metadata item. This process can then be repeated by the controller 112 until an acceptable set of images is obtained.

Note that if no such set is found, the controller 112 can repeat the process starting again at the highest ranked metadata item but with a less stringent level of acceptability for the images. For example, by increasing the range of what is considered "consistent", or by analysing fewer images from the search results.

Figure 4:
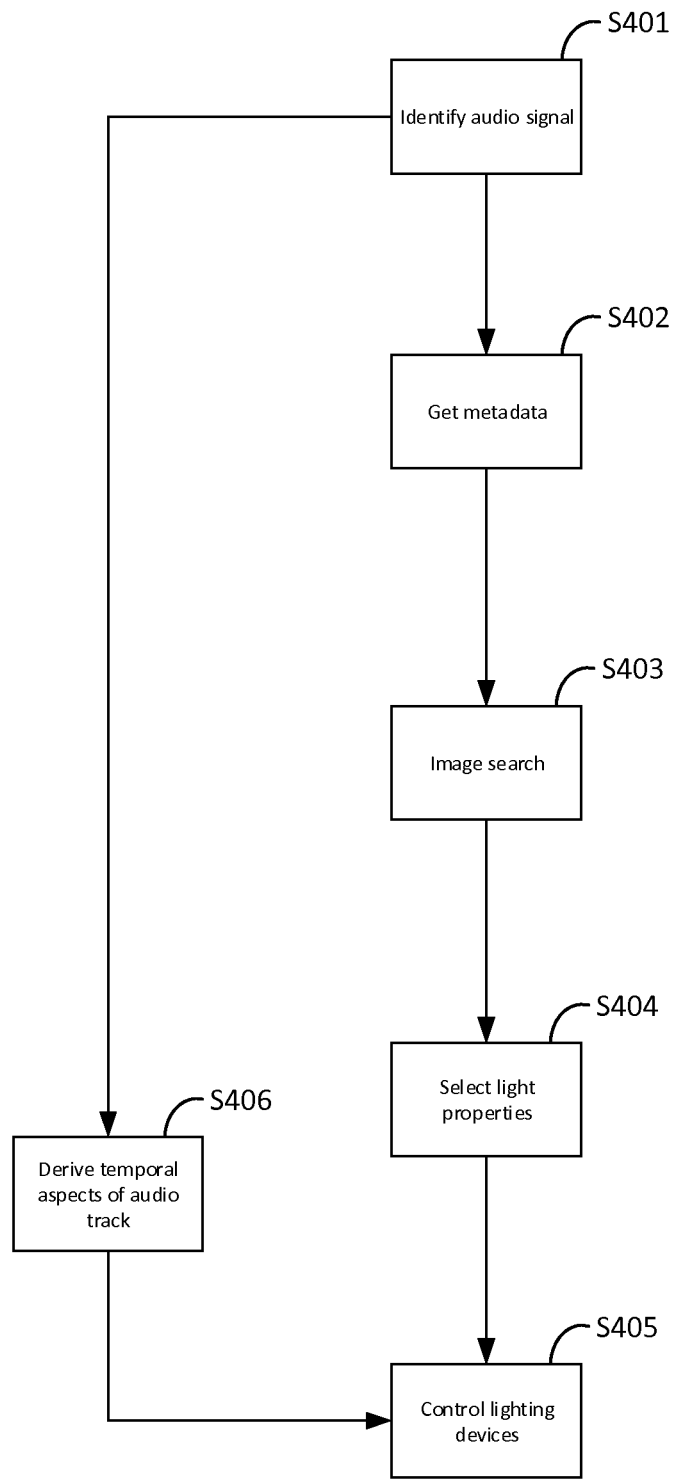
FIG. 4 is a flowchart showing a method according to embodiments of the present invention.
Figure 5:
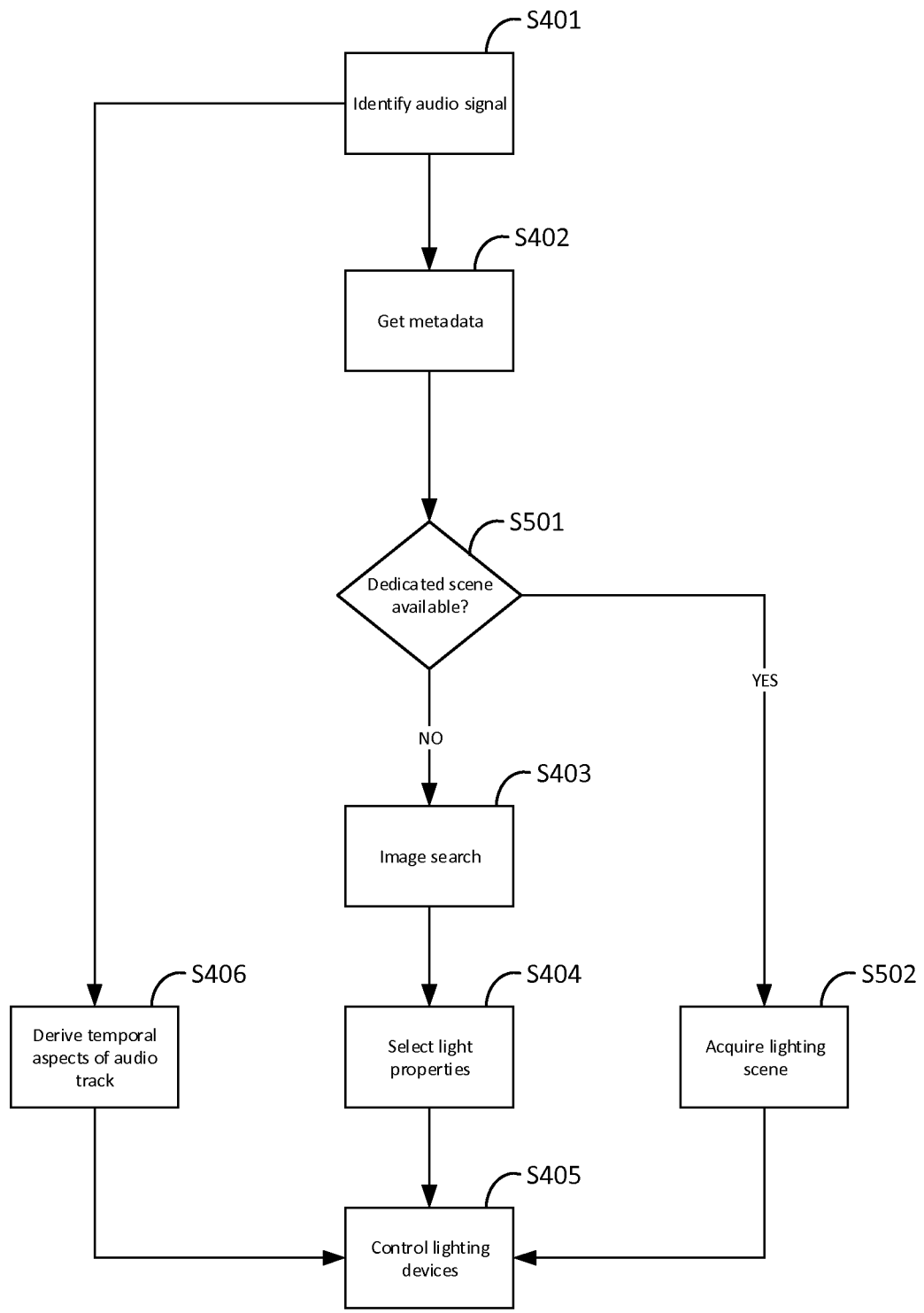
FIG. 5 is a flowchart showing another method according to embodiments of the present invention.
Figure 6:
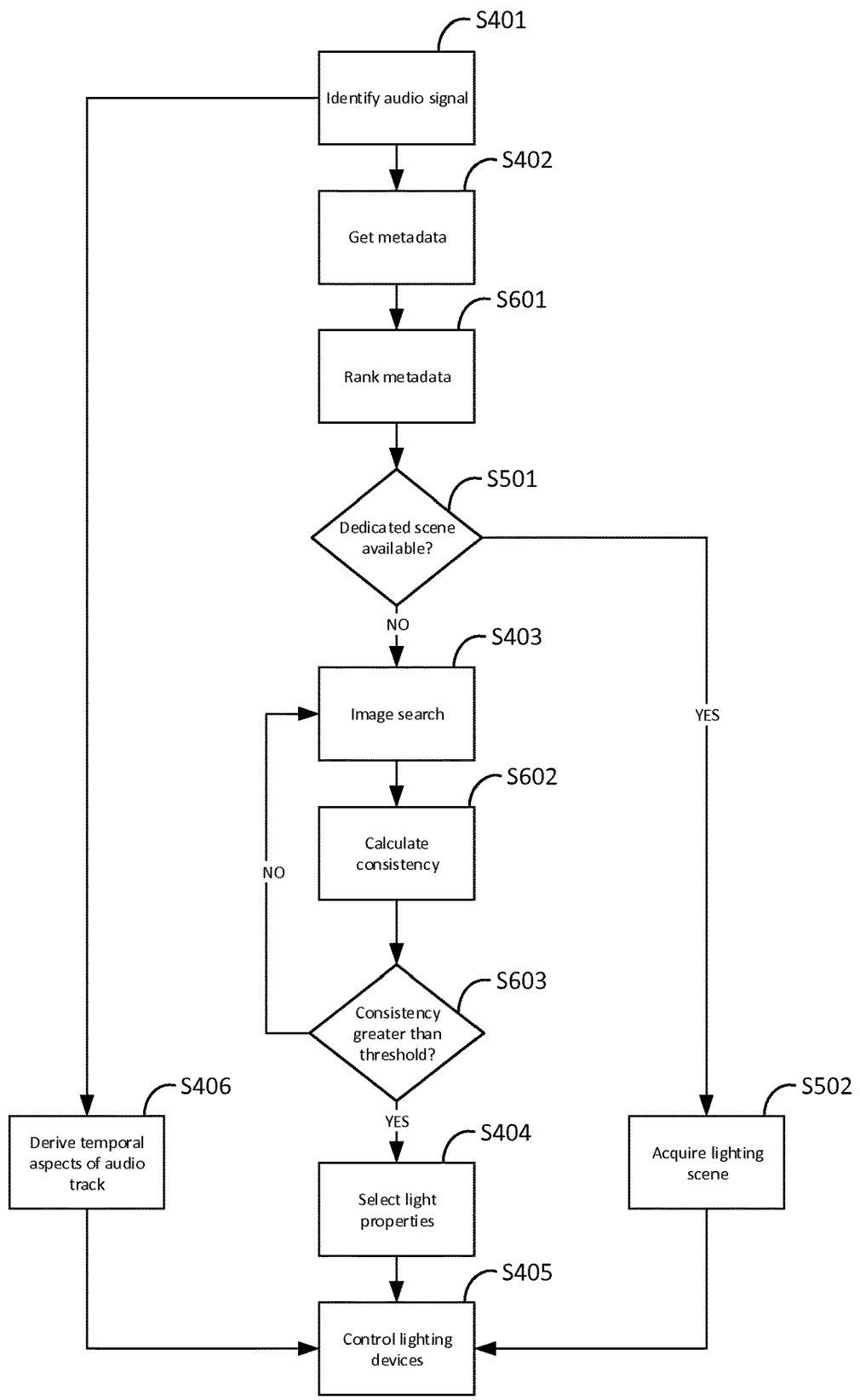
FIG. 6 is a flowchart showing another method according to embodiments of the present invention.

FIGS. 4-6 depict the various steps of methods according to embodiments of the present invention and as performed by processor 302 on the user device 107. In the descriptions of FIGS. 4-6, it is assumed that a "raw" audio signal, i.e. a sound waveform, of a piece of audio such as a song or other piece of music is received and that this waveform is analyzed in order to derive metadata item values such as the title, artist, mood, etc. of the song. However, it is appreciated that the audio signal could be received partly or entirely processed, e.g. the processor 302 could receive the metadata items directly. In these cases it is not necessary for the processor to perform a step of "getting the metadata" separate from receiving the audio signal. The received audio signal and/or partly or entirely processed metadata items are herein referred to generally as information about audio playback. Another alternative is for the controller 112 to extract the metadata items for a particular piece of audio by querying a database (e.g. external database 110, or a database stored on local memory 303. That is, the controller 112 may determine only one metadata item (e.g. the song title, or another metadata item sufficient to identify the particular audio track) or an identification of the audio. The controller 112 can then extract the metadata items (the full set of metadata items associated with that particular audio) from the database.

Additionally, the information about audio playback may relate to audio which is currently playing within the environment 101 through speakers 102a, 102b, but may also in some embodiments refer to "planned" audio which is not yet playing within the environment 101.

In one embodiment, as shown in FIG. 4, the method begins at step S401 when an audio signal is identified. If the audio is stored on memory 303 of the user device 107 and/or being played by speaker 306 of the user device 107, then the user device 107 may already have identified the audio signal. For example, there may be a connection established with an audio playback app which runs on the same device (the user device 107) as the lighting control app. If not, the processor 302 may receive information about audio playback via either the communications interface 304 or the microphone 305. For example, music played by speakers 102a, 102b or even a live performance may be identified by the processor 302 using microphone 305.

Next, in step S402, metadata items associated with the identified audio signal are acquired. As described above, the metadata items may already be known to the processor 302, or at least directly derivable e.g by extracting the metadata items from the audio player (e.g. iPhone, Spotify). Applications like iTunes or Sonos app that play music stored locally can also be used. If not, the processor 302 can use known audio fingerprinting technologies to acquire them. For instance, similar to a Soundhound app, the user may have a "LightHound" app enabling the processor 302 to automatically identify a song or music track and acquire the corresponding metadata items. This may involve analyzing the audio signal and deriving metadata items directly, or by identifying the particular audio track itself (e.g. by title) and then retrieving the corresponding metadata items from a database (e.g. local memory 303 or an external database such as database 110 over the internet 109).

Next, in step S403, after having identified the audio the processor 302 uses the metadata items to retrieve a set of images, e.g. by retrieving a set of images which has previously been stored as relating to a particular metadata item, or by performing an image search. The processor 302 may be configured to use the metadata item corresponding to a default one of the metadata items such as "mood" to retrieve the set of images. For example, the user device 107 may store in memory 303 a set of images tagged with a "rock" genre. In this case the set of images can be retrieved directly from memory 303 without having to perform an image search as described below.

When the set of images is retrieved using an image search, the image search may be a search using an online search engine such as Google image search using communications interface 304 to access Google services over the internet 109, or may be a local image search performed by searching images stored locally on memory 303 of the user device. In this context a "search" refers to identifying images from within a database of images which are related to the particular metadata item. Note that the metadata items may include album art, i.e. images directly associated with the audio. In this case, the album art may be used as the basis for determine light properties, or may be included along with the search results described above.

Either way, in step S404, prominent colors and/or patterns are then derived from the search results, and this color palette is used for generating light effects. The found images are analysed for prominent colours and patterns, and the metadata item or items that yield the most consistent results are selected as a basis to render a light scene.

In the last step S405, the lighting devices are controlled in accordance with the found lighting properties.

FIG. 4 also shows an optional step S406 applicable when the generated lighting scene is a dynamic scenes in which the lighting properties are varied over time. In these cases, the processor, at step S406, derives temporal aspects of the audio track such as input on the phasing, rhythm or beat of the audio track, and uses these to make proper lighting transitions. The dynamics of the lighting scene may also be adjusted to the dynamics and temporal properties of the audio.

FIG. 5 shows one possible extension to the method of FIG. 4. At step S501, after the metadata items have been acquired, a search for available lighting scenes or scripts is performed. I.e. the processor 302 checks if there is already a dedicated lighting scene available which is associated with the audio signal. This can be done via a global web search, by querying dedicated light scene services, or by looking up whether a light scene has been generated earlier by the system. For example, the lighting scene generated at step S405 to accompany a particular piece of music may be stored in memory (e.g. memory 303). This is advantageous because then, at a later time, if that same piece of music is identified then the processor, at step S502, can simply recall the lighting scene from memory rather than performing a new image search S403.

Another possible extension to the method of FIG. 4 is shown in FIG. 6. In this embodiment, image searches are performed for the individual metadata items (e.g. the song title, album, artist name, genre, prominent keywords in the lyrics corresponding to a particular song) in turn in order to identify an acceptable set of images from which to select light properties. Reasons for which a particular set of images may not be acceptable include at least poor inter-image consistency, and/or poor intra-image consistency (described in more detail below).

In order to facilitate these images searches, the metadata items are first ranked at step S601 from a highest ranked to a lowest ranked. There are many possibilities regarding the ranking, and it may be generic or specific. An example of a generic criterion is: if the audio is a music composition and not a soundscape, then "artist name" might be the highest ranked while "genre" might be the lowest. An example of a specific criterion is: for a particular artist the highest ranking metadata item can be a "mood" metadata item of the composition while the "artist name" could be the lowest.

The ranking of the metadata can also be a part of the user configuration, where the user for example might indicate that if a value corresponding to a "mood" metadata item is available, always rank it the highest. This way "mood" will be used for the image search for the appropriate color palette first before trying any other values of metadata items.

The ranking may also be cloud-sourced (e.g. based on a ranking input by an external party, possibly another user). For example, a particular piece of audio may have already been associated with a preferred ranking of metadata items by another user. In this case, the pre-defined ranking can be retrieved by the controller 112 via the network 109 for use in ranking the values of the metadata items.

Similarly, the external user may specify a preferred ranking of metadata items for one or more pieces of audio (e.g. a playlist). In such a case, the controller 112 can use this pre-specified ranking in order to rank the retrieved metadata items.

The pre-ranked metadata items may also be predefined by an application (e.g. Spotify) or application developer rather than a user (e.g. a user of the application).

Other possibilities regarding ranking of metadata (such as purpose of the audio, playlist, creating user etc.) were given above.

Once ranked, the image search of step S403 is performed iteratively working through the ranked metadata items values from highest to lowest, as described below.

At step S602, the set of images resulting from the image search performed based on the highest ranked metadata item value is analyzed for consistency. For example, the set may be analyzed to see if there is a large variation of colors between the images (inter-image consistency) and/or if there is a large variation of colors within the images (intra-image consistency). Another possibility is to identify colors present in album art (if available), and then reject image search results which are not consistent with the album art colors.

As used herein, the term "consistency" is used to refer to determining a similarity or variation, which may be either across one image or between multiple images. For example, a set of single-colour images will have a high intra-image consistency but may have a low inter-image consistency if the colors vary from one image to the next. Conversely, a set of rainbow images will have a low intra-image consistency but may have a high inter-image consistency, this is because the variation of colors across the image is large (i.e. full spectrum) but the images are all very similar. The consistencies may be determined using cross- and auto-correlations as known in the art, or by the use of colour histograms. A colour histogram is a representation of the distribution of colors in an image. Hence, the width an image's color histogram may be used as a measure of the intra-image consistency. Color histograms of multiple images may be compared to determine the inter-image consistency.

At step S603, the consistency of the set of images is compared to a "threshold consistency" (potentially separate inter- and intra-image threshold consistencies). If the consistency is greater than the threshold consistency, then those images may be deemed to be "consistent enough", and thus the method proceeds to step S404 as before. If, however, there is a large variation across/within the images or the images were otherwise found not consistent, then the method reverts to step S403 and performs a new image search based on the second highest ranked metadata item. Again, steps S602 and S603 are performed to check for consistency and the next highest metadata item is used if the image results are not above the threshold consistency.

It will be appreciated that the above embodiments have been described only by way of example.

For instance, to improve the results of the method, based on the audio metadata, the lyrics of a song can be searched and analyzed. For the most frequently occurring relevant words (i.e. filtering out irrelevant words such as "and" "or" and give higher relevance scores to nouns and adjectives), image searches are performed. The results of these image search are then further used to select relevant light-properties input based on consistency scores as described in the method above.

Another extension of the method would be to use the audio metadata to perform a first image search and then use the metadata of (a subset of) the images to perform a second image search to get improved results. The results of this second image search are then further used to select relevant light-properties input based on consistency scores as described in the method above.

In yet another extension, a lighting knowledgebase or light effect service might be provided which enables directly acquiring light effects and lighting programs based on specific labels and keywords. For the short and mid-term it is assumed that an image search can be used as an intermediate step, such that light properties such as colors and pattern can be derived from this.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored and/or distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A method of generating a lighting effect based on metadata of an audio stream, the method comprising steps of:
    extracting one or more metadata items from the audio stream, wherein the metadata items comprise one or more of: artist, song, title, album, genre and mood;
    ranking the metadata items from a highest ranked metadata item to a lowest ranked metadata item according to a ranking scheme;
    retrieving a first set of one or more images based on the value of the highest ranked metadata item;
    determining a color palette consistency of the set of images retrieved based on the highest ranked metadata item;
    if said color palette consistency meets or exceeds a threshold color palette consistency, controlling a light source to generate a lighting effect based on a color palette derived from said first set of one or more images; and else
    if said color palette consistency is less than a threshold color palette consistency, retrieving a second set of images based on the value of a second highest ranked metadata item according to said ranking and controlling a light source to generate a lighting effect based on a color palette derived from said second set of one or more images.

2. The method of claim 1, wherein said set of one or more images is a set of a plurality of images and said consistency is at least an inter-image consistency.

3. The method of claim 1, wherein said consistency is at least an intra-image consistency.

4. The method of claim 1, further comprising a step of, on condition that the determined consistency of the set of images retrieved based on the second highest ranked metadata is not greater than the threshold consistency, reducing the threshold consistency; and, on condition that the consistency of the set of images retrieved based on the highest ranked metadata item is greater than the reduced threshold, controlling the light source to generate the lighting effect based on said first set of images.

5. The method according to claim 1, wherein the lighting effect generated based on said first and/or second set of one or more images is subsequently stored associated with the respective audio stream in the memory.

6. The method according to claim 5, further comprising a step of identifying whether a dedicated lighting effect associated with the audio stream is stored in a memory; and, on condition that a dedicated lighting effect exists, controlling the light source to generate the dedicated lighting effect.

7. The method of claim 1, wherein the step of extracting the metadata items comprises extracting the metadata items using audio fingerprinting.

8. The method of claim 1, wherein the step of extracting the metadata items comprises identifying the audio stream and retrieving the metadata items from a database based on the identification of the audio stream.

9. The method of claim 1, wherein said ranking is performed based on a preferred ranking specified by one or more users.

10. The method of claim 1, further comprising steps of extracting picture metadata items from the retrieved set of images; and retrieving a subsequent set of images based on the picture metadata items, wherein said step of controlling the light source to generate the lighting effect is based on the subsequent set of images.

11. The method of claim 1, wherein the step of retrieving a first set of one or more images based on the metadata items comprises performing an online image search based on the metadata items.

12. A user device comprising a controller, the controller being configured to perform the method according to claim 1.

13. A computer program product for generating a lighting effect based on metadata of an audio stream, the computer program product comprising code embodied on a computer-readable storage medium, wherein the code is configured to as when run on one or more processing units to perform the method of any of claim 1.

* * * * *